US011809850B2

(12) United States Patent
Huruli et al.

(10) Patent No.: US 11,809,850 B2
(45) Date of Patent: Nov. 7, 2023

(54) GENERATING AND DISTRIBUTING CUSTOMIZED EMBEDDED OPERATING SYSTEMS

(71) Applicant: Microsoft Technology Licensing, LLC, Redmond, WA (US)

(72) Inventors: Sudhanva Huruli, Seattle, WA (US); Reuben Ross Olinsky, Seattle, WA (US); Mark Andrew Cawston, King's Lynn (GB); Rebecca Leigh Holt, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/411,975

(22) Filed: Aug. 25, 2021

(65) Prior Publication Data

US 2023/0069485 A1    Mar. 2, 2023

(51) Int. Cl.
*G06F 8/61* (2018.01)
*G06F 21/57* (2013.01)
*H04L 9/32* (2006.01)

(52) U.S. Cl.
CPC ............. *G06F 8/63* (2013.01); *G06F 21/572* (2013.01); *H04L 9/3247* (2013.01); *G06F 2221/033* (2013.01)

(58) Field of Classification Search
CPC .... G06F 8/63; G06F 21/572; G06F 2221/033; H04L 9/3247
See application file for complete search history.

(56) References Cited

U.S. PATENT DOCUMENTS

| 7,379,982 B2 | 5/2008 | Tabbara et al. |
| 7,398,524 B2 | 7/2008 | Shapiro |

(Continued)

FOREIGN PATENT DOCUMENTS

| CN | 1553323 A | * 12/2004 |
| CN | 104794393 A | * 7/2015 |

(Continued)

OTHER PUBLICATIONS

Santos et al., "Using ARM Trustzone to Build a Trusted Language Runtime for Mobile Applications", Mar. 2014, ACM (Year: 2014).*

(Continued)

*Primary Examiner* — Wei Y Zhen
*Assistant Examiner* — Junchun Wu
(74) *Attorney, Agent, or Firm* — RAY QUINNEY & NEBEKER P.C (57) ABSTRACT

This disclosure relates to building and finalizing an operating system (OS) image package in a way that allows for flexibility and customization of OS images while preventing certain runtime modifications after deployment of the OS image package on one or more target devices (e.g., embedded devices). For example, the systems described herein can build an OS image package based on information from an OS manifest that provides a declarative summary of a target OS. The systems described herein can further finalize the OS image package by performing one or more actions on the OS image package that prevent an end-user from performing various runtime modifications to the target OS after deployment of the OS image package. This finalization process provides an improved pipeline for implementing OS updates while providing safeguards against a variety of security risks associated with deploying OS image packages on a large scale.

20 Claims, 7 Drawing Sheets

(56) References Cited

U.S. PATENT DOCUMENTS

| | | | |
|---|---|---|---|
| 7,614,051 B2 | 11/2009 | Glaum et al. | |
| 8,181,021 B2* | 5/2012 | Ginter | H04L 63/04 |
| | | | 713/193 |
| 10,261,782 B2* | 4/2019 | Suarez | G06F 8/71 |
| 10,509,932 B2* | 12/2019 | Ebrahimi | G09C 5/00 |
| 11,100,233 B2* | 8/2021 | Nadgowda | G06F 21/566 |
| 11,104,502 B2* | 8/2021 | Espinosa | A23L 3/01 |
| 2004/0221146 A1 | 11/2004 | Baumann | |
| 2005/0132179 A1 | 6/2005 | Glaum et al. | |
| 2005/0132357 A1 | 6/2005 | Shell et al. | |
| 2014/0101429 A1* | 4/2014 | Bennah | G06F 11/2289 |
| | | | 713/100 |
| 2014/0181792 A1* | 6/2014 | Fanning | G06F 8/60 |
| | | | 717/124 |
| 2015/0089494 A1* | 3/2015 | Beak | G06F 9/45558 |
| | | | 718/1 |
| 2017/0180137 A1* | 6/2017 | Spanier | H04L 9/3247 |
| 2020/0097276 A1* | 3/2020 | Jacobson | G06F 3/04845 |
| 2020/0151335 A1* | 5/2020 | Ayoub | G06F 21/572 |
| 2020/0167149 A1* | 5/2020 | Kludy | H04L 63/08 |
| 2020/0287723 A1* | 9/2020 | Ilany | G06F 21/602 |
| 2021/0004464 A1* | 1/2021 | Lundeby | H04L 41/082 |
| 2021/0149682 A1 | 5/2021 | Muthu et al. | |
| 2021/0271489 A1* | 9/2021 | Singhal | G06F 8/63 |
| 2022/0129539 A1* | 4/2022 | Walsh | G06F 21/53 |

FOREIGN PATENT DOCUMENTS

| | | | | |
|---|---|---|---|---|
| EP | 2684331 B1 * | 4/2020 | | G06F 21/335 |
| JP | 2011154522 A * | 8/2011 | | |
| WO | WO-2016209250 A1 * | 12/2016 | | G06F 11/1469 |

OTHER PUBLICATIONS

Jian et al., "Document Electronic Seal System Based on Digital Watermark and DWT Technology", 2010, IEEE (Year: 2010).*

Suzaki et al., "DeviceVeil: Robust Authentication for Individual USB Devices Using Physical Unclonable Functions", 2019, IEEE (Year: 2019).*

Puesche et al., "Concept of Smart Building Cyber-physical Systems Including Tamper Resistant Endpoints", 2018, IEEE (Year: 2018).*

"Package Management", Retrieved from: https://web.archive.org/web/20200509140031/https:/ubuntu.com/server/docs/package-management, May 9, 2020, 6 pages.

"Release Notes for Red Hat Enterprise Linux 8.3", Retrieved from: https://web.archive.org/web/20201104172039/https:/access.redhat.com/documentation/en-us/red_hat_enterprise_linux/8/html-single/8.3_release_notes/index, Nov. 4, 2020, 77 Pages.

"SUSE Linux Enterprise Server 12 SP1", Retrieved from: https://www.suse.com/releasenotes/x86_64/SUSE-SLES/12-SP1/, Aug. 3, 2017, 64 Pages.

Hunt, et al., "The Seven Properties of Highly Secure Devices", In Technical report MSR-TR-2017-16, Microsoft Research NExT Operating Systems Technologies Group, Mar. 31, 2017, 10 Pages.

"International Search Report and Written Opinion Issued in PCT Application No. PCT/US22/037231", dated Oct. 31, 2022, 10 Pages.

* cited by examiner

GENERATING AND DISTRIBUTING CUSTOMIZED EMBEDDED OPERATING SYSTEMS

BACKGROUND

Recent years have seen a precipitous rise in the use of computing devices across a variety of applications. As computing devices have become more ubiquitous, a variety of computing devices having varying levels of capabilities and functionalities have been implemented across an even greater variety of applications and devices. For example, in addition to computing systems and server devices having increasingly complex microprocessors implemented thereon, embedded systems are becoming increasingly common across consumer, industrial, automotive, medical, and other applications.

As these embedded systems and associated embedded devices increase in complexity and connectivity, a number of difficulties have arisen. For example, as embedded devices increase in complexity and become more integrated in wireless communication networks, these embedded devices pose a security concern, particularly where dedicated functionalities of the embedded devices can be modified with relative ease. Moreover, as embedded devices increase in complexity and provide a wider range of functional features, many embedded devices are reprogrammed or reconfigured to operate in a way that was never intended, which can pose a combination of security and/or safety risks.

These and other challenges exist in connection with deploying embedded devices and associated embedded systems on a wide scale.

DETAILED DESCRIPTION

The present disclosure is generally related to building and finalizing an OS image package in a way that prevents runtime modifications after deployment and installation of the OS image package on a target class of devices (e.g., embedded devices). In particular, an OS image generation system can build an OS image package based on information from an OS manifest that provides a declarative summary of a target device OS to be instantiated on one or more target devices of a particular class of target devices. The OS image generation system can further finalize the OS image package by sealing the package and preventing runtime modifications to the finalized OS image package upon installation of the target device OS on the target device(s). This application also describes features related to deploying the OS image package as well as further developing (e.g., prior to or after finalization) and providing post-deployment updates to the OS image package in a way that provides customization of the OS image package as well as safeguards against a variety of security risks associated with deploying the OS image package on a large scale.

As an illustrative example, and as will be discussed in further detail below, a computing device having an OS image generation system implemented thereon can receive an OS manifest including a declarative summary of a target device OS to be instantiated on a target device of a target device class and including a plurality of resource identifiers. The OS image generation system can build an OS image package from a base OS template based on information contained within an OS manifest. For example, an OS manifest may include an indication of various resources (e.g., executable packages, OS kernels, various modules) that may be installed or otherwise implemented within the OS image package. The OS image generation system can additionally generate a finalized OS image package by sealing the OS image package in a way that prevents runtime modifications from being made to the finalized OS image package after distribution of the OS image package to a plurality of target devices. The OS image generation system can further cause the OS image package to be deployed to one or more target devices (e.g., of a similar target device class).

The present disclosure includes a number of practical applications that provide benefits and/or solve problems associated with generating and distributing OS image packages on a large scale in a way that enables customizations and flexible functionality while also preventing runtime modifications after deployment of the OS image packages on one or more target devices. Some non-limiting examples of these applications and benefits are discussed in further detail below.

For example, by finalizing (e.g., sealing) the OS image package in accordance with embodiments described herein, the system prevents runtime modifications that can be used to expose security risks of the target device(s). For example, as will be discussed in further detail below, the system can perform one or more finalization actions that prevents potentially harmful applications of the device that can be installed without a developer and/or device owner ever being aware.

As another example, finalizing the OS image package in accordance with one or more embodiments described herein can facilitate convenient and efficient updates of the target OS even after deployment of the finalized OS image package. For example, where the OS image package is deployed on a set of target devices for a particular target class, further updates may be performed by a developer or manufacturer of the target device and redeployed in a uniform way across the set of target machines. In particular, as a result of sealing the OS image package to prevent runtime modifications, updating the image package can be a standard process across multiple devices of the target device class based on a safe assumption that the target OSs on the target devices have not been modified after installation of the OSs. This standardization of the update process enables rollout of an OS update with less difficulty and expense than where an operating system has different dependencies and applications implemented thereon as a result of individual runtime modifications that have been applied to selective target systems.

The systems described herein can further facilitate installing various resources within an OS image in an offline environment. This offline implementation enables the OS image package to be instantiated across a variety of platforms. For example, as will be discussed herein, one or more embodiments of the systems described herein can emulate a runtime environment of a target device (e.g., in an offline environment provided by a developer machine) in a way that enables running postprocessing scripts on a development machine rather than the target machine. Moreover, in contrast to a difficult and time-consuming process in which drivers are distributed and tested for every platform, the systems described herein can incorporate resource identifiers that target individual packages or feeds generally, thus providing an easy pipeline that enables developers to access the latest operating system that a particular hardware (e.g., microprocessor) supports. This allows additions of drives and facilitates easier distribution downstream without requiring developers to individually select libraries, packages, and driver components. Furthermore, the installation of various sources described herein can be difficult where an architecture of the target device is different from a development machine.

As will be discussed in further detail below, each of the benefits described herein can be realized while still allowing customization and flexibility in the features and functionalities incorporated within the OS image package. For example, because building and updating the OS image package can be performed in an offline manner, multiple developers on different developer machines can participate in the development of the OS image package prior to deploying a finalized OS image package. This offline development further enables resources to be drawn from a number of source feeds in a way that enables the OS image generation system to leverage packages and other resources accessible via a variety of feeds. Indeed, as will be discussed in further detail herein, these source feeds can originate from any number of sources and, in some cases, refer to customized or local feeds created by the developers themselves.

As illustrated in the foregoing discussion, the present disclosure utilizes a variety of terms to describe features and advantages of the systems described herein. Additional detail is now provided regarding the meaning of some example terms.

For example, as used herein, a "target device" may refer to any computing or processing device for which an operating system (OS) image package is developed. In one or more embodiments described herein, a target device refers specifically to an embedded device or a system of multiple embedded devices. In one or more embodiments, a target device refers to an embedded device having special-purpose computing hardware that may or may not have connectivity to one or more additional computing devices. In one or more embodiments described herein, the target device may have an OS installed thereon that configures the target device to perform a discrete set of one or more applications. In one or more embodiments, target devices may refer to Internet of Things (IoT) devices having sensors, cameras, or any other content capturing device thereon that is capable of performing some processing of the data and communicating the data to one or more additional devices over a local or non-local network.

As used herein, an "OS image" or "OS image package" may refer interchangeably to a file or set of files that contains an operating system, executable packages, and any data (e.g., data files, file system) related to one or more applications that may be executed on a device (e.g., a target device). In one or more embodiments described herein, an OS image package may refer to a linear set of bits that are logically composed of an OS kernel, executable packages, binaries, data content (e.g., images, text), metadata, and any other content described herein. As will be discussed in further detail herein, an OS image may be built by adding or installing various resources associated with various identifiers referenced within an OS manifest.

As used herein, a "resource" or "OS resource" may refer to a variety of objects or content that can be installed or otherwise added to an OS image package. For example, in one or more embodiments described herein, a resource my refer to an executable package, which may include binaries associated with various features and functionality that a developer can add to the OS. An executable package (or simply a "package") can refer to a self-contained collection of files and/or configurations that have identity and version as well as requirements and/or dependencies of other packages. In one or more embodiments, a resource refers to a resource feed, which may include a collection of packages and other content that may be added to the OS. Other example resources may include identified dependencies, formats, and content files.

Figure 1:
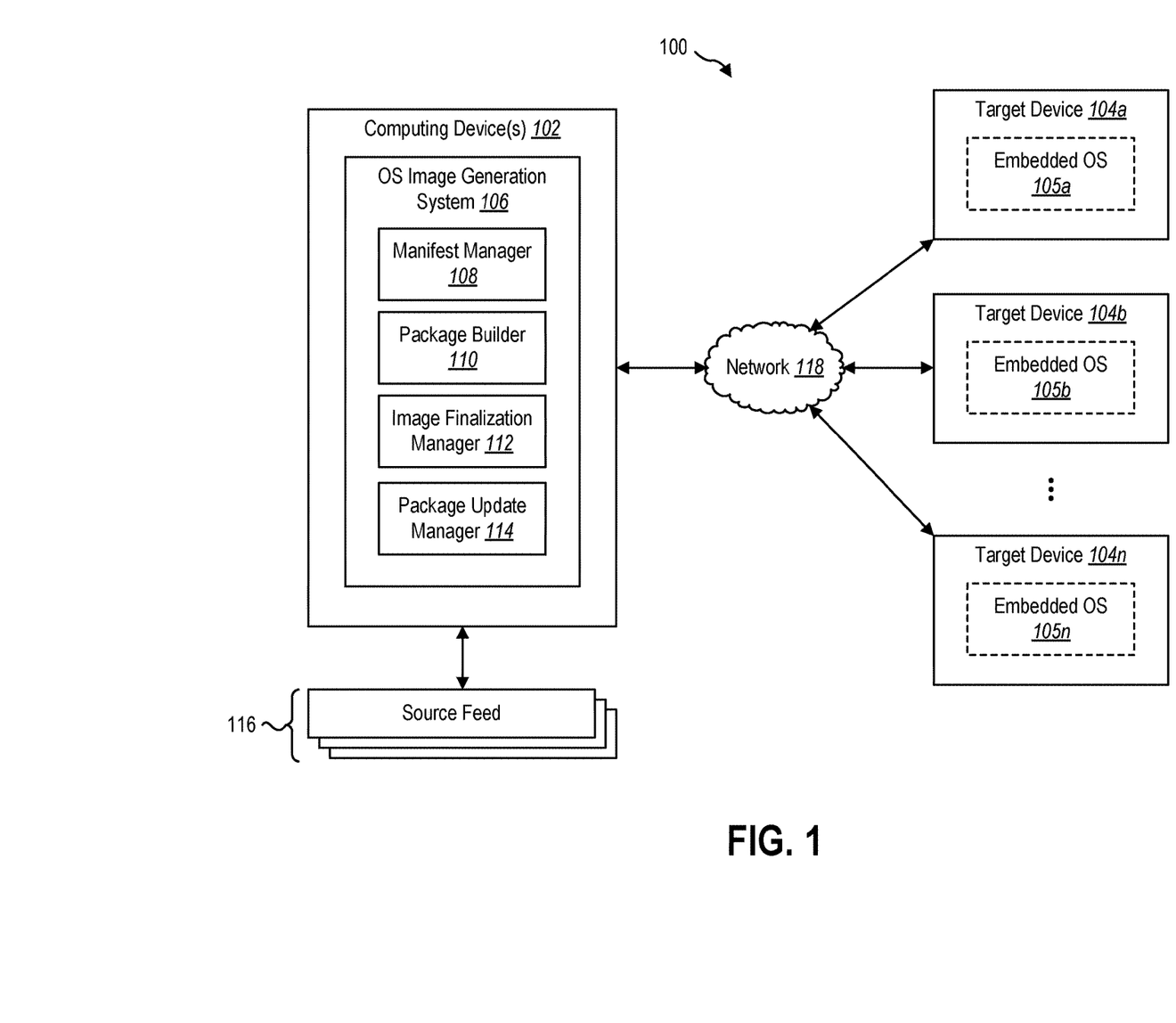
FIG. 1 illustrates an example environment in which an operating system (OS) image generation system is implemented on a computing device in accordance with one or more embodiments.

Additional detail will now be provided regarding systems described herein in relation to illustrative figures portraying example implementations. For example, FIG. 1 illustrates an example environment 100 including one or more computing device(s) 102 and a plurality of target devices 104a-n. As shown in FIG. 1, the computing device(s) 102 includes an OS image generation system 106 implemented thereon. As further shown, the OS image generation system 106 may include a manifest manager 108, package builder 110, image finalization manager 112, and a package update manager 114. While FIG. 1 illustrates an implementation in which the components 108-114 of the OS image generation system 106 are implemented on a single computing device 102, other implementations may involve one or more of the components 108-114 or any of the features and functionalities of the OS image generation system 106 being implemented across one or multiple computing devices.

The computing device(s) 102 may refer to a variety of devices capable of operation in a variety of computing environments. For example, in one or more embodiments, the computing device(s) 102 may include a mobile device, such as a mobile telephone, a smart phone, a personal digital assistant (PDA), a tablet, or a laptop. Additionally, or alternatively, the computing device(s) 102 may include one or more non-mobile devices such as a desktop computer, server device, or other non-portable device. In one or more embodiments described herein, the computing device(s) 102 is referred to as a developer device (or developer machine) based on a user of the computing device(s) 102 developing an OS image to be deployed on the plurality of target devices 104a-n in accordance with one or more embodiments. The computing device(s) 102 and other devices shown in FIG. 1 may include features and functionality described below in connection with FIG. 8.

In one or more embodiments, the computing device(s) 102 may refer to one or more server devices configured to host services that provide any of the features of the OS image generation system 106 described herein. For example, the OS image generation system 106 may refer to a cloud-based service or application(s) that provides features and functionality that enable a developer to utilize resources of a cloud computing system to build an OS image, finalize the OS image, and deploy the OS image on any number of target devices (e.g., target devices 104*a-n*). Thus, while one or more embodiments described herein refer specifically to a computing device having the OS image generation system 106 implemented thereon, it will be appreciated that features described in connection with the OS image generation system 106 on a single computing device may refer to implementations of the OS image generation system 106 in which the sub-components 108-114 are distributed across multiple devices and computing environments.

As mentioned above, and as shown in FIG. 1, the environment 100 may include a plurality of target devices 104*a-n*. In one or more embodiments, the target devices 104*a-n* refer to embedded devices having embedded operating systems (OSs) 105*a-n* deployed thereon. In one or more implementations, the target devices 104*a-n* refer to a set of target devices of a similar target device class. For example, the target devices 104*a-n* may refer to a set of similar devices having a similar set of functionalities and/or being configured to operate on a similar computing platform. As will be discussed in further detail below, the OS image generation system 106 may cause embedded OSs 105*a-n* to be deployed on the target devices 104*a-n* based on a finalized OS image package generated and deployed in accordance with one or more embodiments.

As shown in FIG. 1, the computing device(s) 102 and target devices 104*a-n* may communicate via a network 118. It will be understood that the computing device(s) 102 may also communicate with other computing devices and the source feeds 116 via the network 118. The network 118 may include one or multiple networks that use one or more communication platforms or technologies for transmitting data. For example, the network 118 may include the Internet or other data link that enables transport of electronic data between the computing device(s) 102 and any other devices of the environment 100.

As mentioned above, the OS image generation system 106 may include a manifest manager 108. The manifest manager 108 may identify or otherwise receive an OS manifest including a declarative summary of an embedded OS to be deployed on a target device. In this example, the manifest manager 108 may identify an OS manifest including an identification of a base OS template. The OS manifest may also include a number of data fields associated with various types of resources that can be installed or otherwise incorporated within an OS image package that is constructed based on information from the OS manifest. Indeed, the OS manifest may include any number of data fields related to a wide variety of resource types. Additional information in connection with an example OS manifest will be discussed below in connection with FIG. 5.

In addition to receiving or otherwise identifying the OS manifest, the manifest manager 108 may present the manifest to a user via a graphical user interface of the computing device(s) 102 to enable a user of the OS image generation system 106 to provide data associated with various resources. For example, in one or more embodiments, a developer may select, add, or otherwise identify one or more resource for various packages, formats, feeds, configurations, policies, and other resources that may be installed to a base OS template identified or otherwise referenced by the OS manifest.

As further shown in FIG. 1, the OS image generation system 106 may include a package builder 110. The package builder 110 may provide features and functionality related to constructing the OS image package from the base OS image and in accordance with the various resource identifiers included or otherwise added to the OS manifest. As will be discussed in further detail below, the package builder 110 may identify various sources indicated by the resource identifiers (e.g., packages, feeds), add one or more artifacts to the base OS template, resolve various dependencies within the OS image package and perform various operations in accordance with the declarations included within the OS manifest. Indeed, as will be discussed in further detail below, the package builder 110 may generate an OS image package by performing any number of operations to the base OS template to create an OS image file having a state that reflects the declarations from the OS manifest.

As further shown in FIG. 1, the OS image generation system 106 may include an image finalization manager 112 for finalizing an OS image package constructed by the package builder 110. As will be discussed in further detail below, the image finalization manager 112 may finalize an OS image package in a number of ways and at different stages of the development process. In particular, the image finalization manager 112 can perform one or more actions to the OS image package that, when performed, cause the OS image package to be sealed and prevent runtime modifications to be made once deployed on the target devices 104*a-n*. Additional information in connection with finalizing the OS image package will be discussed below.

As further shown in FIG. 1, the OS image generation system 106 may include a package update manager 114. As noted above, the OS image package may be finalized at a number of stages of the development process. For example, in one or more embodiments, the package update manager 114 provides features and functionality that enable one or more developers to provide edits or modifications to an OS image package and/or OS manifest to modify or otherwise refine functionality of the OS image package prior to deployment on the target devices 104*a-n*. Alternatively, in one or more embodiments, the package update manager 114 provides features and functionality that enable one or more developers to refine or modify the OS image package after deployment such that the embedded OSs 105*a-n* may be updated on a large scale across multiple target devices 104*a-n* of a similar device class. Additional information in connection with updating the OS image package before or after deployment will be discussed below in connection with FIGS. 3 and 4.

As shown in FIG. 1, the environment 100 may additionally include a plurality of source feeds 116. These source feeds 116 may refer to a variety of storage sources that provide access to a number of resources referenced by the OS manifest. For example, one or more of the source feeds 116 may refer to package feeds that provide access to and information associated with a number of executable packages that can be added to the OS image package. In addition, the source feeds 116 may provide dependency information that facilitates resolution of dependencies between the various executable packages and other resources at build-time.

In one or more embodiments, the source feeds 116 identify or otherwise reference a storage source that changes over time. For example, the OS manifest may identify a specific source feed corresponding to a particular target device, format, or target device platform to provide access to package data and/or dependency information as it presently exists within the source feed. In this way, if the source feed is updated over time, the OS manifest does not need to be updated. Rather, in one or more embodiments, one or more resources may be added or updated to the source feed without modifying the OS manifest and the OS image package will reflect a current state of the source feed at the time the OS image package is built (e.g., by the package builder 110).

As mentioned above, and as shown in FIG. 1, the OS image generation system 106 can cause a finalized OS image package to be deployed to the target device. As used herein, deploying the OS image package to the target device may include an act of providing an executable OS image package to the target device via the network 118. In one or more embodiments, deploying the OS image package may additionally include installing a target OS on the target device based on the OS image package. Thus, as used herein, causing the OS image package to be deployed may include both providing the executable OS image package to the target devices 104a-n as well as causing the embedded OSs 105a-n to be installed or otherwise instantiated on the target devices 104a-n.

As indicated above, the OS image package enables one or more developers to create a customized OS image package capable of providing any number of the benefits described herein. For example, as will be discussed below, the OS image package may be updated any number of times by one or more developers prior to finalizing and deploying the finalized OS image package to the target devices 104a-n. In addition, or as an alternative, the OS image generation system 106 enables a developer to continue developing the OS image and, upon making modifications that improve upon a previously deployed OS image package, providing updates to the embedded OS(s) 105 on the target device(s) 104a-n that can be applied universally across a set of target devices 104a-n. Additional detail in connection with these and other implementations will be discussed below in connection with illustrated examples.

Figure 2:
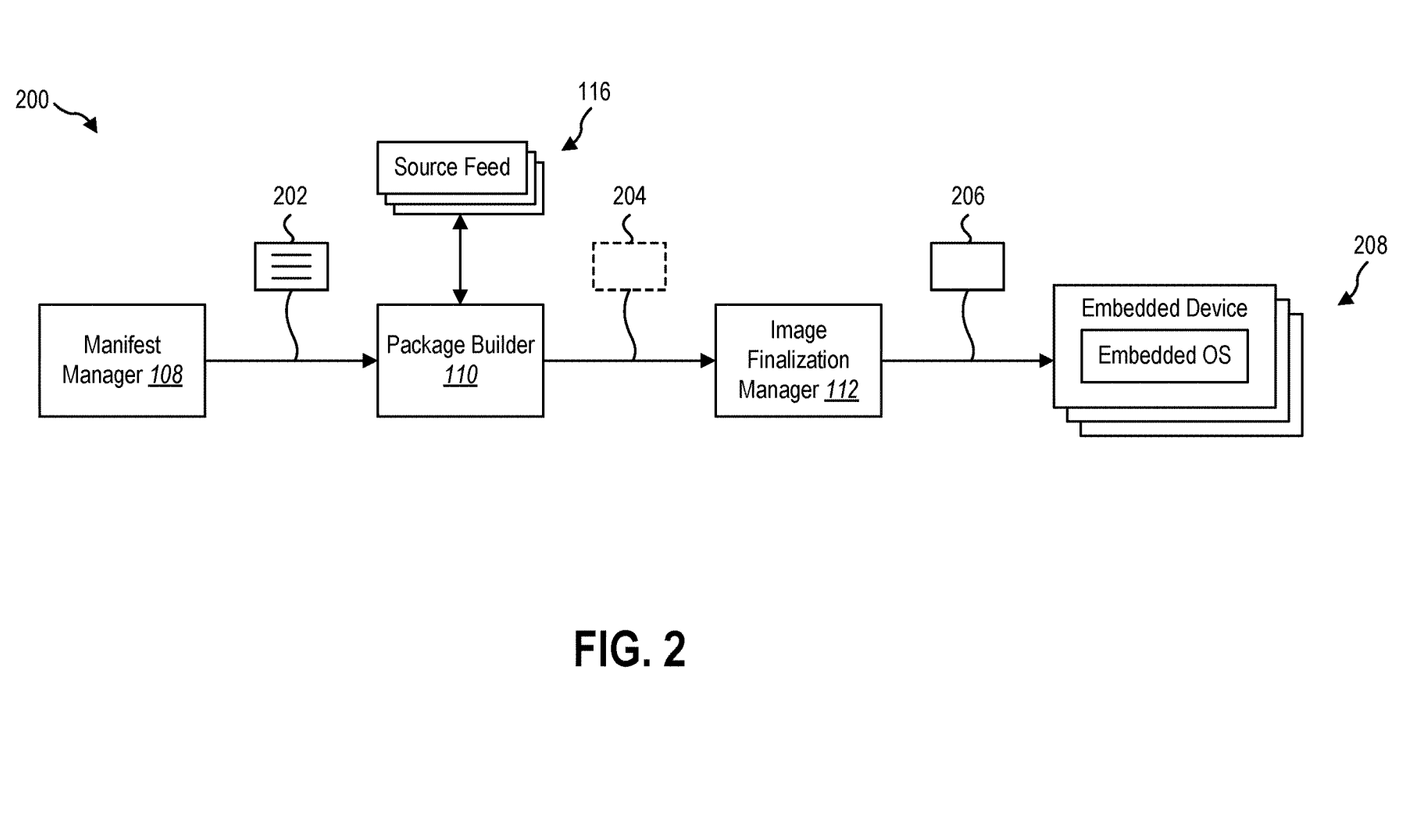
FIG. 2 illustrates an example implementation of the OS image generation system for building and sealing an OS image package in accordance with one or more embodiments.

FIG. 2 illustrates an example implementation showing an example workflow 200 that may be performed by the OS image generation system 106 in accordance with one or more embodiments discussed herein. In particular, FIG. 2 illustrates a workflow 200 showing a process whereby the OS image generation system 106 can build an OS image package, finalize the OS image package, and deploy a finalized OS image package to a plurality of embedded devices of a particular device class.

As shown in FIG. 2, a manifest manager 108 may generate an OS manifest including a variety of information included therein. As noted above, the manifest manager 108 can receive or otherwise access a manifest template including a number of data fields that enable a developer to indicate resources to be incorporated within an OS image package. For example, the OS manifest may include a number of data fields indicating resource types that a developer can modify to indicate a specific resource or resource feed(s).

The manifest manager 108 may enable a developer to provide a number of resource identifiers corresponding one or more resources. For example, the OS manifest may include a data field for referencing a particular base or template OS image. In one or more embodiments, the OS manifest includes or otherwise references a template image provided by a software vendor, which may include a textual description including a declarative summary of the desired configuration of the resulting OS image package. The OS manifest may additionally include references to optional packages that may be installed into the framework of the OS image package. For example, the OS manifest may include resource identifiers that point to executable packages that may be incorporated within the OS image package and which may provide various features and functionality to an embedded OS upon installation on the embedded devices.

Indeed, as will be discussed in further detail below, the OS manifest may include reference identifiers to a wide variety of resource types. For example, in one or more embodiments, the OS manifest includes reference identifiers that indicate sets of resource feeds from where package dependencies can be resolved. In one or more embodiments, the OS manifest references one or more different formats indicating units of software having different dependencies. In one or more embodiments, the OS manifest includes additional configuration scripts that describe custom actions to run and apply to the OS image package prior to initiating the finalization process. The OS manifest may further include additional policy data and access controls for inclusion within the OS image package. Additional information will be discussed below in connection with an example OS manifest illustrated in FIG. 5.

Indeed, as indicated above, the manifest manager 108 can provide a composition tool that enables a developer to generate an OS manifest that provides a number of declarations to indicate a desired state of the OS image package. The manifest manager 108 may provide the completed manifest 202 to the package builder 110 for use in building the OS image package.

As shown in FIG. 2, the package builder 110 can receive the declarative intent of the complete manifest 202 and build an OS image package based on the manifest 202. In one or more embodiments, the package builder 110 generates an unsealed OS image package 204 by taking the declarative intent of the manifest and operationalizing it into iterative steps. The package builder 110 may then execute the steps to produce an OS image artifact (e.g., an extensible OS image package) in accordance with one or more embodiments described herein.

In one or more embodiments, the package builder 110 builds the OS image package by accessing the various packages and other resources identified within the OS manifest 202. As shown in FIG. 2, these resources can be accessed via one or more source feeds 116 indicated by the respective reference identifiers. For example, the package builder 110 can access a first source feed to pull a kernel and device tree. The package builder 110 can access a second one or more source feeds to pull various packages for use in building a filesystem for the embedded OS. In one or more embodiments, the package builder 110 can access any number of source feeds in generating the OS image package that incorporates the various resources identified within the OS manifest.

As an illustrative example, in one or more embodiments, the package builder 110 builds the OS package by combining declarative components of the OS manifest 202 (e.g., kernel(s), packages) into units that form the OS image package. Where the OS image package specifies dependencies, the package builder 110 may add the dependencies and other transitive dependencies to a resulting unit without being identified by an individual user. In addition to adding discrete components to the OS image package, the package builder 110 may, in some cases, extend individual components already present. For example, the package builder 110 can supply additional kernel arguments. In one or more embodiments, a user (e.g., developer) may have discretion to customize a composition stage. Extensibility of a package management system can provide logic that supports other types of packages. As will be discussed in further detail herein, in one or more embodiments, the package builder 110 can run scripts (e.g., post-processing) which are executed during composition, and which can perform a variety of functions including dynamically create new content, delete existing content, or modify existing content.

After building the OS image package, the package builder 110 can provide the unsealed OS image package 204 to the image finalization manager 112 for further processing and finalizing the OS image package prior to deployment. As noted above, the image finalization manager 112 can generate a finalized OS image 206 by performing one or more of a variety of finalization actions on the unsealed OS image package 204.

For example, in one or more embodiments, the image finalization manager 112 finalizes the OS image by applying a digital signature to an OS image package. In one or more embodiments, the image finalization manager 112 cryptographically signs the OS image package to prevent unauthorized modifications to various packages that have been incorporated within the OS image package.

As another example, the image finalization manager 112 may finalize the OS image package by removing the package database contents from the OS image package. For instance, in one or more embodiments, the package builder 110 may utilize the package database contents to construct the body of the OS image package and resolve various dependencies therein. The image finalization manager 112 may then remove the package database contents as part of the finalization process. Removing the package database content may prevent a user of the embedded device 208 from performing runtime modifications or otherwise modifying the embedded OS.

In this implementation, even though the package database contents have been removed in a way that makes modifying a deployed OS image package more difficult, it will be noted that the OS image generation system 106 may nonetheless maintain an audit log. For example, the OS image generation system 106 may maintain a record of actions or other modifications made to the base OS image as part of the process to generate the OS image package. In addition, in one or more embodiments, the OS image generation system 106 can include an audit log within the finalized image package. While this audit log does not specifically include the package database contents, the audit log can provide a mechanism detailing the transformations applied to the OS image package to reach the desired state.

Thus, while the image finalization manager 112 may remove the package database content from the finalized OS image package, the OS image generation system 106 may nonetheless leave behind sufficient data in the audit log in a parse-able format that describes actions performed on the base OS template to produce the result. This audit log allows a developer or owner of the target device(s) to take a template image or a resulting finalized image and inspect it to verify that the OS image package was digitally signed correctly as well as inspect what was added and removed. The audit log further enables a developer to view what scripts were run against the OS image package.

In one or more embodiments, the image finalization manager 112 finalizes the OS image package using security labeling. For example, in one or more embodiments, the image finalization manager 112 may apply one or more security policies by tracking the composed policies, computing a logical conclusion of the composed policies, and applying the logical conclusion to the file contents for the OS image package. In one or more embodiments, the image finalization manager 112 compresses the OS image package such that a finalized OS image package (e.g., a compressed OS image package) cannot be modified via runtime modifications after deployment on the embedded device.

In the example shown in FIG. 2, after finalizing the OS image package, the image finalization manager 112 can provide the finalized OS image package 206 to any number of embedded devices 208 for deployment of the finalized OS image package 206 thereon. As shown in FIG. 2, the embedded devices 208 can install or otherwise implement an embedded OS thereon based on the finalized OS image package 206 provided to each of the embedded devices 208.

As part of the build, finalization, or deployment process, in one or more embodiments, the OS image generation system 106 can generate a debug image in addition to the various packages that are included within the OS image package. For example, because embedded devices may lack sufficient space for debug symbols to be included with the deployed OS image package, the OS image generation system 106 can assemble debug counterparts for various pieces of the OS image package to create a debug image. This debug image may be used by a development process or debugger(s) when trying to analyze or debug a deployed system.

Figure 3:
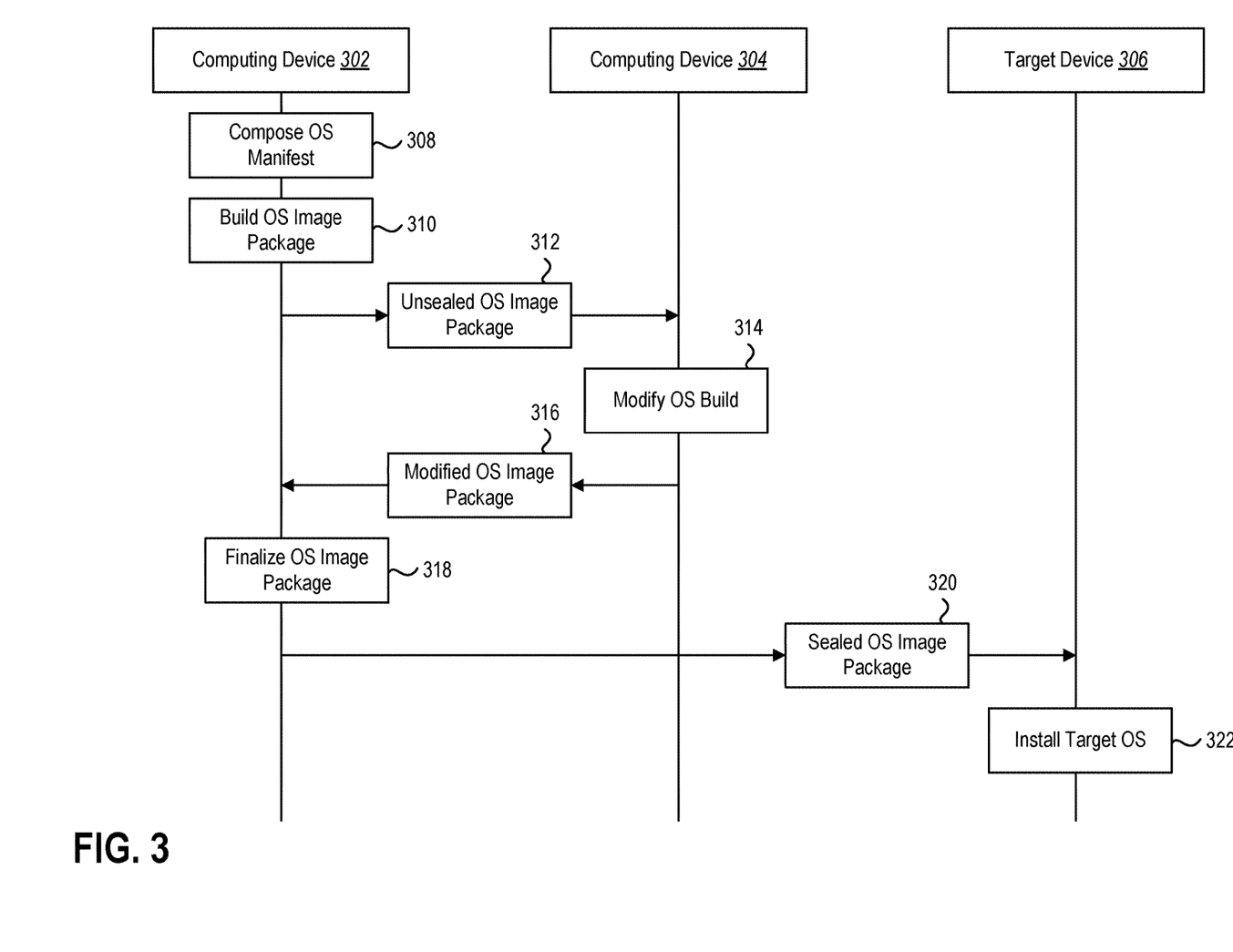
FIG. 3 illustrates an example implementation in which an OS image package is generated and updated prior to finalization in accordance with one or more embodiments.
Figure 4:
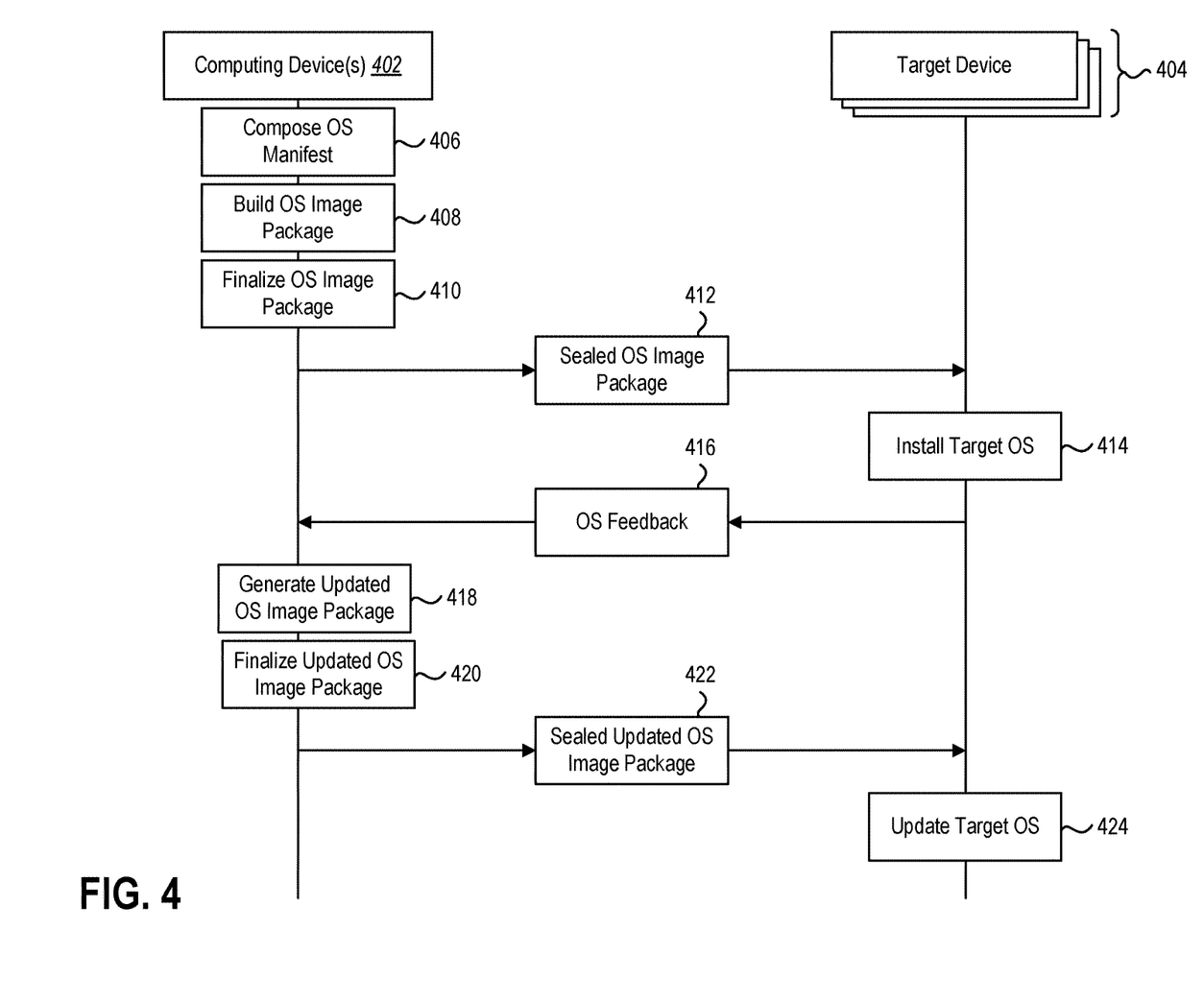
FIG. 4 illustrates an example implementation in which a deployed OS image package is updated and re-deployed in accordance with one or more embodiments.

Additional detail will now be discussed in connection with example implementations in which the OS image package can be updated in accordance with one or more embodiments. For example, FIG. 3 illustrates an example implementation in which multiple developers can collaboratively provide input and modify versions of an OS image package prior to finalization and deployment of the OS image package to a target device. In addition, and as will be discussed in further detail below, FIG. 4 illustrates an example implementation in which a sealed OS image package is deployed on a set of target devices in conjunction with a series of acts related to generating an updated sealed OS image package that can be updated in a uniform way across the set of target devices. It will be appreciated that the implementations described in connection with FIGS. 3 and 4 are not mutually exclusive. Accordingly, one or more features described in connection with each of the respective examples may apply to one or more additional embodiments described herein.

FIG. 3 illustrates a series of acts and interactions between a first computing device 302 (e.g., a first developer machine), a second computing device 304 (e.g., a second developer machine), and a target device 306 (e.g., an embedded device). As shown in FIG. 3 the first computing device 302 may perform an act 308 of composing an OS manifest. As indicated above, the OS manifest may include a declarative summary of a target device OS and may include any number of resource identifiers associated with executable packages, resource feeds, and other resources that may be included within an OS image package. The act 308 of composing the OS manifest may be inclusive of other acts described herein related to receiving, identifying, or otherwise composing an OS manifest.

As further shown, a first computing device 302 may perform an act 310 of building an OS image package. In particular, the first computing device 302 may build an OS image package in accordance with declarations and other information (e.g., resource identifiers) included within the OS manifest. In one or more embodiments, the first computing device adds referenced application packages, executable binaries, OS kernels, kernel modules, and any other resources that can be added to a base OS template referenced by the OS manifest.

While one or more embodiments described herein involve finalizing the OS image package soon or right after building the OS image package, FIG. 3 illustrates an example shown an act 312 of providing an unsealed OS image package to a second computing device 304. This pre-distribution of the unsealed OS image package enables one or more additional developers (e.g., a user of the second computing device 304) to collaborate in generating an OS image package prior to finalization and deployment to a set of target devices.

In one or more embodiments, the second computing device 304 refers to another computing device having similar features and functionality as the first computing device 302. Each of these computing devices 302-304 may include similar features as the computing device(s) 102 described above in connection with FIG. 1. In one or more embodiments, the second computing device 304 may provide a configuration or computing environment that enables emulation of a target environment or target platform (e.g., a target format) that enables a developer to test out various features of the OS image package on an environment emulated by the second computing device 304. As an example, the second computing device 304 may be configured to emulate processes and run instructions that more closely reflect a target platform of the target device 306 than the first computing device 302. For example, one or both of the computing devices 302-304 may be configured to emulate a runtime environment for the target device(s) by mounting a file system of the target device(s) on an OS of the computing devices 302-304 and running one or more post-processing scripts to resolve one or more dependencies of the OS image package.

As shown in FIG. 3, the second computing device 304 may perform an act 314 of modifying the OS build for the initial OS image package provided by the first computing device 302. For example, the second computing device 304 may modify one or more of the resource identifiers, add new resource identifiers, remove other resource identifiers, choose a new OS base template, or any other modification(s) that changes the resource identifiers indicated by the unsealed OS image package provide by the first computing device 302. As shown in FIG. 2, the second computing device 304 may perform an act 316 of providing a modified OS image package to the first computing device 302 for further development and/or finalization. Alternatively, in one or more embodiments, the second computing device 304 can finalize the OS image package in accordance with one or more embodiments described herein.

As shown in FIG. 3, upon receiving the modified OS image package, the first computing device can perform one or more additional modifications to the OS image package prior to finalization. In the example shown in FIG. 3, the first computing device 302 may perform an act 318 of finalizing the OS image package. The first computing device 302 can seal the modified OS image package in a number of ways including, by way of example, cryptographically signing the OS image package, removing one or more system files, compressing the OS image package file(s), and/or other finalization processes that prevents runtime modifications to the OS after installation on the target device 306.

As shown in FIG. 3, the first computing device 302 may perform an act 320 of providing the sealed OS image package to the target device 306 for deployment thereon. In one or more embodiments, the first computing device 302 distributes the finalized OS image package on a larger scale to multiple target devices of a corresponding device class. In the example shown in FIG. 3, upon receiving the finalized OS image package, the target device 306 can perform an act 322 of installing or otherwise instantiating the OS image package on the target device 206. As noted above, the target device may refer to an embedded device having an embedded OS loaded thereon based on the finalized OS image package provided to the target device 206.

FIG. 4 illustrates another example implementation in which an OS image package may be updated in accordance with one or more embodiments described herein. In particular, FIG. 4 illustrates an example in which a finalized image package is deployed by a computing device 402 to a set of target devices 404 and updated using an offline process in a way that facilitates a convenient and uniform update process across the target devices 404.

As shown in FIG. 4, a computing device 402 can perform an act 406 of composing an OS manifest. As further shown, the computing device 402 can perform an act 408 of building an OS image package. The acts 406-408 of composing the OS manifest and building the OS image package may include similar features as acts 308-310 discussed above in connection with FIG. 3.

As further shown in FIG. 4, the computing device 402 can perform an act 410 of finalizing (e.g., sealing) an OS image package. As illustrated in FIG. 4, the computing device 402 may additionally perform an act 412 of providing a sealed OS image package to a set of target devices 404 for deployment thereon. As shown in FIG. 4, the set of target devices 404 can perform an act 414 of installing the target OS on the respective devices based on the sealed OS image package provided by the computing device 402. It will be understood that the acts 410-414 of finalizing the OS image package, providing the sealed OS image package, and installing the target OS on the target devices 404 may include similar features and acts described in connection with one or more embodiments discussed above.

As further shown in FIG. 4, the computing device 402 may perform an act 416 of providing OS feedback. This may include providing feedback indicating metrics and/or various issues associated with performance of the target OSs deployed on the target devices 404. For example, in one or more embodiments, the target devices 404 (or systems on which the target devices 404 are implemented) may provide feedback indicating performance statistics, errors or device failures, and any other information that would be relevant in diagnosing one or more issues that can be improved upon in future updates and deployments.

It will be noted that feedback from the target devices 404 may be received with an assumption that runtime modifications have not been performed on operating systems (e.g., the OS image packages) of the respective target devices 404. This assumption based on the sealed nature of the OS image package enables the computing device 402 (or other device(s) analyzing the feedback) to accurately diagnose problems as they exist for the entire class of target devices as well as problems that may be individual for specific target devices and/or target devices that are implemented within specific computing environments.

Based on the feedback, the computing device 402 may perform an act 418 of generating an updated OS image package. In one or more embodiments, this involves obtaining a copy of the OS image build prior to finalization and applying one or more changes to the existing framework of the OS image package. In one or more embodiments, the computing device 402 modifies the OS image package by identifying different source feeds, accessing a different OS base template, or applying any number of modifications to an OS manifest and/or build process to generate a modified OS image package.

Upon generating the updated OS image package, the computing device 402 may perform an act 420 of finalizing the updated OS image package. The act 420 of finalizing the updated OS image package may include similar actions as the act 410 of finalizing the initial OS image package previously deployed to the target devices 404. For example, the computing device 402 may cryptographically sign the updated OS image package, remove one or more system files, or other finalization actions described herein.

After finalizing the OS image package, the computing device 402 may perform an act 422 of providing the sealed updated OS image package to the target devices 404. Upon receipt of the sealed updated OS image package, the target devices 404 can perform an act of updating the target OS based on the sealed updated OS image package.

As noted above, as a result of the initial OS image package being finalized to prevent runtime modifications on the respective target devices, the act of updating the OS image packages on the target devices 404 may be a uniform or otherwise predictable process across an entire set of target devices 404. For example, because the OS image packages should have unchanged content, updating the devices can be performed in a similar away across a set of target devices 404. This uniformity across the device class facilitates a more efficient update process with fewer errors to debug across the entire device class. This is an improvement over conventional updates in which dependencies, system files, and other features of the deployed OS may have been modified or customized on a device-by-device basis.

Figure 5:
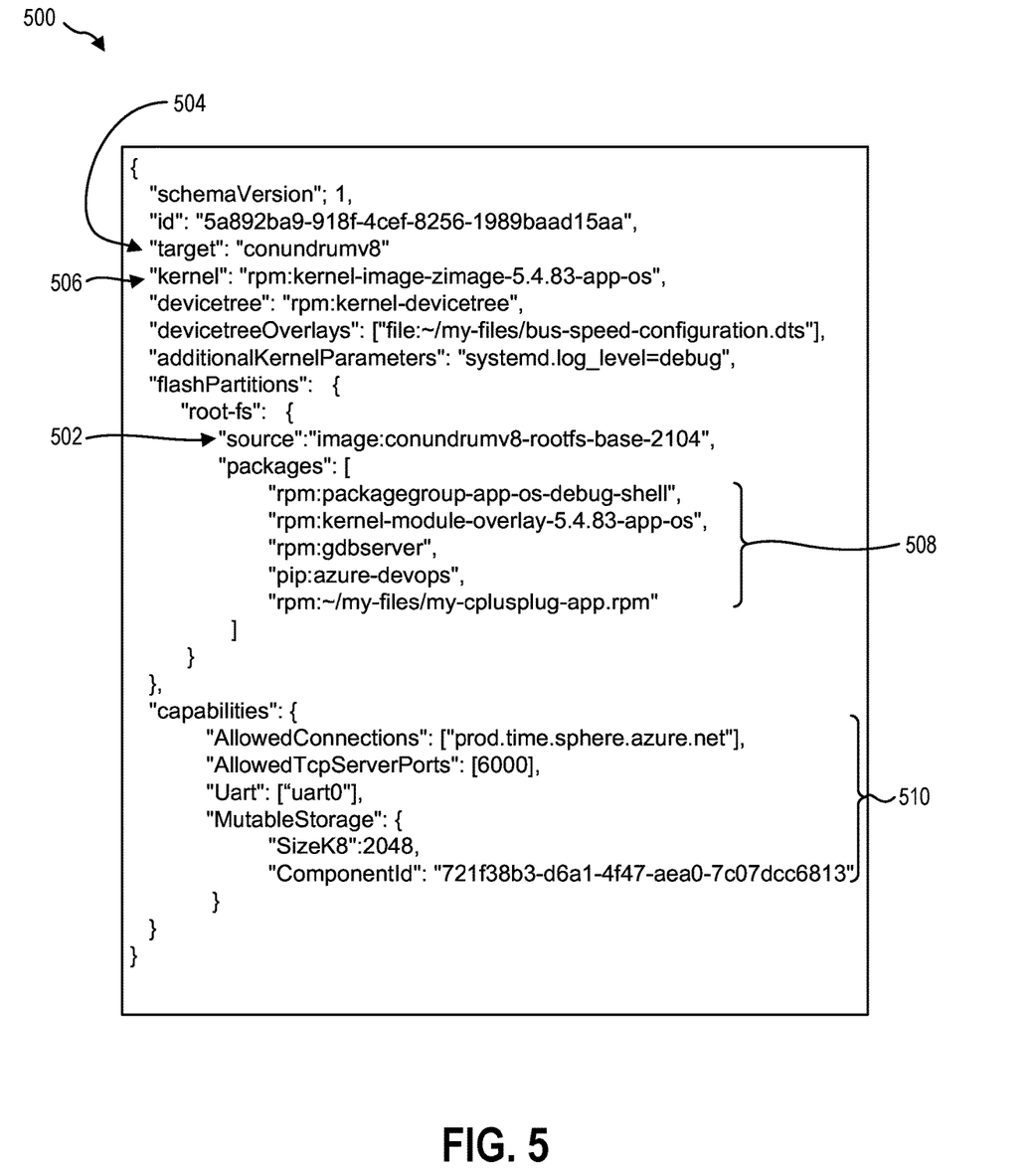
FIG. 5 illustrates an example OS manifest including a declarative summary of a target device OS in accordance with one or more embodiments.

FIG. 5 illustrates an example OS manifest in accordance with one or more embodiments. For example, as shown in FIG. 5, an example OS manifest 500 may include a variety of resource identifiers that indicate corresponding resources that may be incorporated within an OS image. A few non-limiting example identifiers will be discussed in further detail. As a first example, the OS manifest 500 may include a first resource identifier 502 that points to a base OS template. This is indicated as a "source" identifier in the example OS manifest 500. This OS template may refer to a template for an OS image package provided by a software vendor or a customized template provided by any number of sources. In one or more embodiments, the OS template is obtainable via a source feed, which may be identified by the first resource identifier 502.

As another example, the OS template 500 may include a second resource identifier 504 that points to a target hardware. This is indicated as a "target" identifier in the example OS manifest 500. This may indicate a specific device type, device class, or a specific model of the embedded hardware on which the target OS is to be deployed.

The OS manifest 500 further illustrates other reference identifiers. For example, a third reference identifier 506 ("kernel" identifier) may reference an OS kernel. In one or more embodiments, the kernel identifier identifies a file name or other resource for a pre-built kernel and device tree that is selectable based on a version. In one or more embodiments, the kernel identifier includes one or more kernel parameters for configuring how an OS kernel will behave.

The OS manifest 500 may additionally include one or more fourth identifiers 508 indicating a number of selectable packages that can be implemented within an OS image package. For example, the fourth identifier(s) 508 may indicate kernel modules, OSS components, installable applications, corresponding formats, and/or platforms. In one or more embodiments, the OS manifest 500 may identify specific resource feeds that provide access to the identified packages.

As further shown, the OS manifest 500 may additionally include one or more fifth identifiers 510 indicating various capabilities of a resulting OS image package. For example, as shown in FIG. 5, the fifth identifier(s) 510 may identify network accesses (e.g., allowed connections, allowed server ports), peripheral usage, and mutable storage characteristics of the OS image package.

Figure 6:
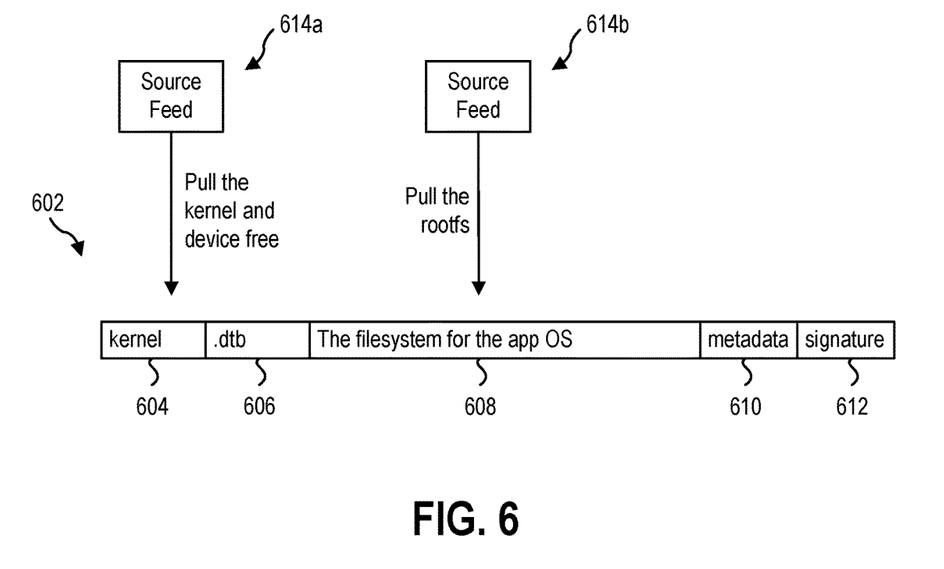
FIG. 6 illustrates an example implementation of an OS image package generated by an OS image generation system in accordance with one or more embodiments.

FIG. 6 illustrates an example implementation of an OS image package 602 in accordance with one or more embodiments described herein. For example, FIG. 6 illustrates an example OS image package 602 that has been built using a linear data format to include a kernel 604, a device tree 606 (e.g., a .dtb file), a filesystem for the application OS 608, metadata 610, and a signature 612. As further shown, the OS image generation system 106 may draw from a number of source feeds including. For example, in one or more embodiments, the OS image generation system 106 may pull the kernel 604 and device tree 606 from a first source feed 614a. As further shown, the OS image generation system 106 may pull system files and various packages and/or binaries from a second source feed 614b (e.g., a container registry). Other implementations may include additional or fewer source feeds.

Figure 7:
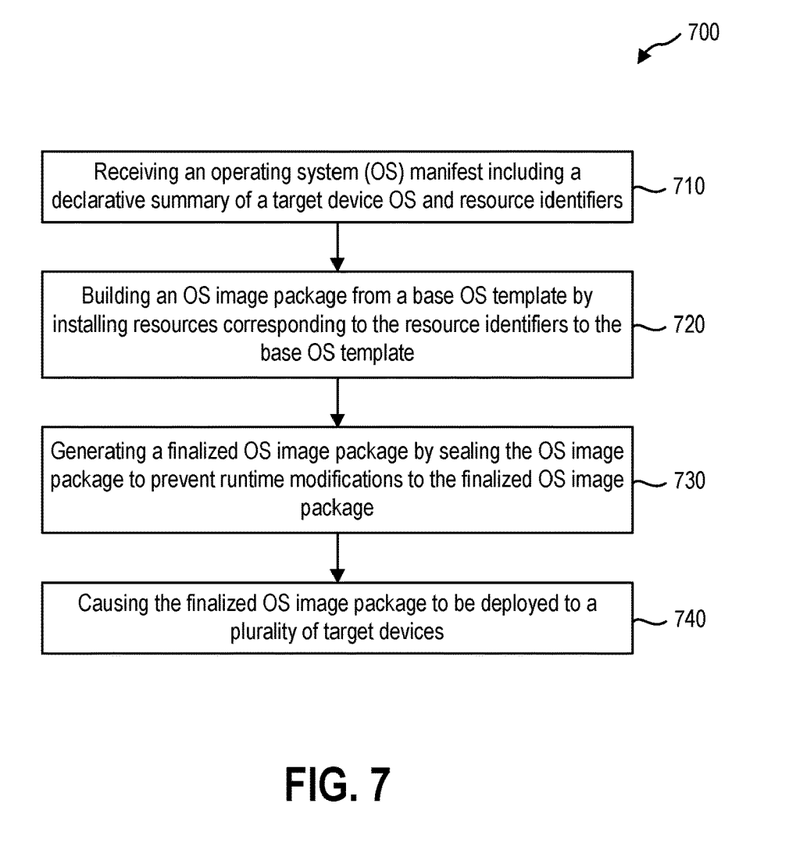
FIG. 7 illustrates an example series of acts for building, finalizing, and deploying an OS image package in accordance with one or more embodiments.

Turning now to FIG. 7, this figure illustrates an example flowchart including a series of acts for building, finalizing, and deploying a sealed OS image package in accordance with one or more embodiments described herein. While FIG. 7 illustrates acts according to one or more embodiments, alternative embodiments may omit, add to, reorder, and/or modify any of the acts shown in FIG. 7. The acts of FIG. 7 can be performed as part of a method. Alternatively, a non-transitory computer-readable medium can include instructions that, when executed by one or more processors, cause a computing device (e.g., a server device) to perform the acts of FIG. 7. In still further embodiments, a system can perform the acts of FIG. 7.

FIG. 7 illustrates a series of acts 700 related to building, finalizing, and deploying a sealed OS image package to one or more target devices. As shown in FIG. 7, the series of acts 700 may include an act 710 of receiving an operating system (OS) manifest including a declarative summary of a target device OS and resource identifiers. For example, in one or more embodiments, the act 710 may include receiving, at a computing device, an operating system (OS) manifest including a declarative summary of a target device OS to be instantiated on a target device of a target device class where the OS manifest includes a plurality of resource identifiers. In one or more implementations, the target device class includes a target class of embedded devices having a corresponding set of functional features.

As further shown, the series of acts 700 may include an act 720 of building an OS image package from a base OS template by installing resources corresponding to the resource identifiers to the base OS template. For example, in one or more embodiments, the act 720 involves building, by the computing device, an OS image package from a base OS template referenced by the OS manifest by installing resources corresponding to the plurality of resource identifiers to the base OS template.

As further shown, the series of acts 700 may include an act 730 of generating a finalized OS image package by sealing the OS image package to prevent runtime modifications to the finalized OS image package. For example, in one or more embodiments, the act 730 involves generating, by the computing device, a finalized OS image package by sealing the OS image package to prevent runtime modifications to the finalized OS image package upon installation of the target device OS on the target device.

As further shown, the series of acts 700 may include an act 740 of causing the finalized OS image package to be deployed to a plurality of target devices. For example, in one or more embodiments, the act 740 involves causing the finalized OS image package to be deployed to a plurality of target devices of the target device class.

In one or more embodiments, the plurality of resource identifiers reference one or more executable packages configured to be added to the OS image package and deployed in conjunction with the finalized OS image package on the plurality of target devices. In one or more embodiments, the one or more executable packages include an OS kernel and one or more modules configured to be plugged into the OS kernel. In one or more embodiments, the plurality of resource identifiers reference one or more resource feeds. A resource feed may include a collection of executable packages configured to be added to the OS image package. The collection of executable packages may include one or more executable binaries associated with the target device class.

In one or more embodiments, building the OS image package includes composing a linear set of data including content of an OS kernel and the resources obtained from one or more feeds referenced within the OS manifest. In one or more embodiments, building the OS image package includes, prior to sealing the OS image package, emulating a runtime environment for a given target device by mounting a file system of the given target device on an OS of the computing device and running one or more post-processing scripts to resolve one or more dependencies of the OS image package. In one or more embodiments, sealing the OS image package includes cryptographically signing the OS image package.

In one or more embodiments, building the OS image package includes installing package databases that are relied upon to resolve dependencies within the OS image package. Further, in one or more embodiments, sealing the OS image package includes removing the package databases prior to deploying the OS image package to the plurality of target devices. In one or more embodiments, generating the finalized OS image package further includes adding an audit log within the OS image package, the audit log including an indication of actions performed on the base OS template to generate the OS image package in accordance with the declarative summary of the target device OS from the OS manifest.

In one or more embodiments, the series of acts 700 includes providing an unsealed copy of the OS image package to a second computing device. The series of acts 700 may also include receiving, from the second computing device, one or more modifications to the OS manifest. The series of acts 700 may further include performing an update of the OS image package based on the one or more modifications to the OS manifest.

In one or more embodiments, performing the update includes building a modified OS image package including one or more additional resources based on the at least one modified resource identifier, generating an updated finalized OS image package by sealing the modified OS image package to prevent runtime modifications to the modified OS image package upon installation of an updated OS to be deployed on the target device of the target device class, and causing the updated finalized OS image to be deployed to the plurality of target devices of the target device class.

Figure 8:
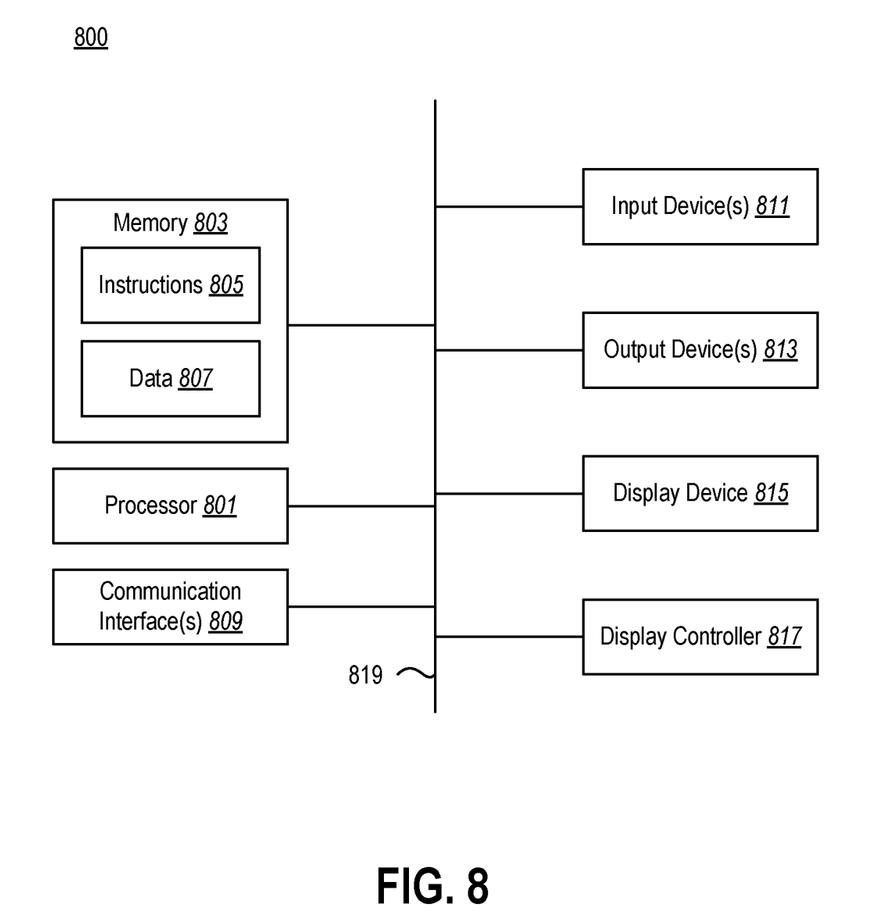
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that may be included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving, at a computing device, an operating system (OS) manifest including a declarative summary of a target device OS to be instantiated on a plurality of target devices of a target device class, wherein the OS manifest includes a plurality of resource identifiers and identifies the target device class;
   building, by the computing device, an OS image package from a base OS template referenced by the OS manifest by installing resources corresponding to the plurality of resource identifiers of the base OS template;
   generating, by the computing device, a finalized OS image package by sealing the OS image package to disable runtime modifications to the finalized OS image package upon installation of the finalized OS image package on a target device of the plurality of target devices; and
   causing the finalized OS image package to be deployed to the plurality of target devices of the target device class identified within the OS manifest.

2. The method of claim 1, wherein the plurality of resource identifiers reference one or more executable packages configured to be added to the OS image package and deployed in conjunction with the finalized OS image package on the plurality of target devices.

3. The method of claim 2, wherein the one or more executable packages include an OS kernel and one or more modules configured to be plugged into the OS kernel.

4. The method of claim 1, wherein the plurality of resource identifiers reference one or more resource feeds, wherein a resource feed includes a collection of executable packages configured to be added to the OS image package, and wherein the collection of executable packages includes one or more executable binaries associated with the target device class.

5. The method of claim 1, wherein building the OS image package includes composing a linear set of data including content of an OS kernel and the resources obtained from one or more feeds referenced within the OS manifest.

6. The method of claim 1, wherein building the OS image package includes, prior to sealing the OS image package, emulating a runtime environment for a given target device by mounting a file system of the given target device on an OS of the computing device and running one or more post-processing scripts to resolve one or more dependencies of the OS image package.

7. The method of claim 1, wherein sealing the OS image package includes cryptographically signing the OS image package.

8. The method of claim 1,
   wherein building the OS image package includes installing package databases that are relied upon to resolve dependencies within the OS image package, and
   wherein sealing the OS image package includes removing the package databases prior to deploying the OS image package to the plurality of target devices.

9. The method of claim 1, wherein generating the finalized OS image package further includes adding an audit log within the OS image package, the audit log including an indication of actions performed on the base OS template to generate the OS image package in accordance with the declarative summary of the target device OS from the OS manifest.

10. The method of claim 1, further comprising:
    providing an unsealed copy of the OS image package to a second computing device;

receiving, from the second computing device, one or more modifications to the OS manifest; and performing an update of the OS image package based on the one or more modifications to the OS manifest.

11. The method of claim 10, wherein performing the update of the OS image package includes:

building a modified OS image package including one or more additional resources based on the at least one modified resource identifier;

generating an updated finalized OS image package by sealing the modified OS image package to prevent runtime modifications to the modified OS image package upon installation of an updated OS to be deployed on the plurality of target devices of the target device class; and causing the updated finalized OS image to be deployed to the plurality of target devices of the target device class.

12. The method of claim 1, wherein the target device class includes a target class of embedded devices having a corresponding set of functional features.

13. A system, comprising:

one or more processors;

memory in electronic communication with the one or more processors; and instructions stored in the memory, the instructions being executable by the one or more processors to:

receive, at a computing device, an operating system (OS) manifest including a declarative summary of a target device OS to be instantiated on a plurality of target devices of a target device class, wherein the OS manifest includes a plurality of resource identifiers and identifies the target device class;

build, by the computing device, an OS image package from a base OS template referenced by the OS manifest by installing resources corresponding to the plurality of resource identifiers of the base OS template;

generate, by the computing device, a finalized OS image package by sealing the OS image package to disable runtime modifications to the finalized OS image package upon installation of the finalized OS image package on a target device of the plurality of target devices; and cause the finalized OS image package to be deployed to the plurality of target devices of the target device class identified within the OS manifest.

14. The system of claim 13, wherein the plurality of resource identifiers reference one or more executable packages configured to be added to the OS image package and deployed in conjunction with the finalized OS image package on the plurality of target devices.

15. The system of claim 13, wherein the plurality of resource identifiers reference one or more resource feeds, wherein a resource feed includes a collection of executable packages configured to be added to the OS image package, and wherein the collection of executable packages includes one or more executable binaries associated with the target device class.

16. The system of claim 13, wherein building the OS image package includes, prior to sealing the OS image package, emulating a runtime environment for the given target device by mounting a file system of the given target device on an OS of the computing device and running one or more post-processing scripts to resolve one or more dependencies of the OS image package.

17. The system of claim 13, wherein sealing the OS image package includes one or more of:

cryptographically signing the OS image package; and removing, prior to deploying the OS image package to the plurality of target devices, package databases that have been installed and relied upon to resolve dependencies within the OS image package.

18. The system of claim 13, wherein the target device class includes a target class of embedded devices having a corresponding set of functional features.

19. A non-transitory computer readable medium storing instructions thereon that, when executed by one or more processors, causes a computing device to:

receive an operating system (OS) manifest including a declarative summary of a target device OS to be instantiated on a plurality of target devices of a target device class, wherein the OS manifest includes a plurality of resource identifiers and identifies the target device class;

build an OS image package from a base OS template referenced by the OS manifest by installing resources corresponding to the plurality of resource identifiers of the base OS template;

generate a finalized OS image package by sealing the OS image package to disable runtime modifications to the finalized OS image package upon installation of the finalized OS image package on a target device of the plurality of target devices; and cause the finalized OS image package to be deployed to the plurality of target devices of the target device class identified within the OS manifest.

20. The non-transitory computer readable medium of claim 19, wherein sealing the OS image package includes one or more of:

cryptographically signing the OS image package; and removing, prior to deploying the OS image package to the plurality of target devices, package databases that have been installed and relied upon to resolve dependencies within the OS image package.

* * * * *